Patented Oct. 30, 1923.

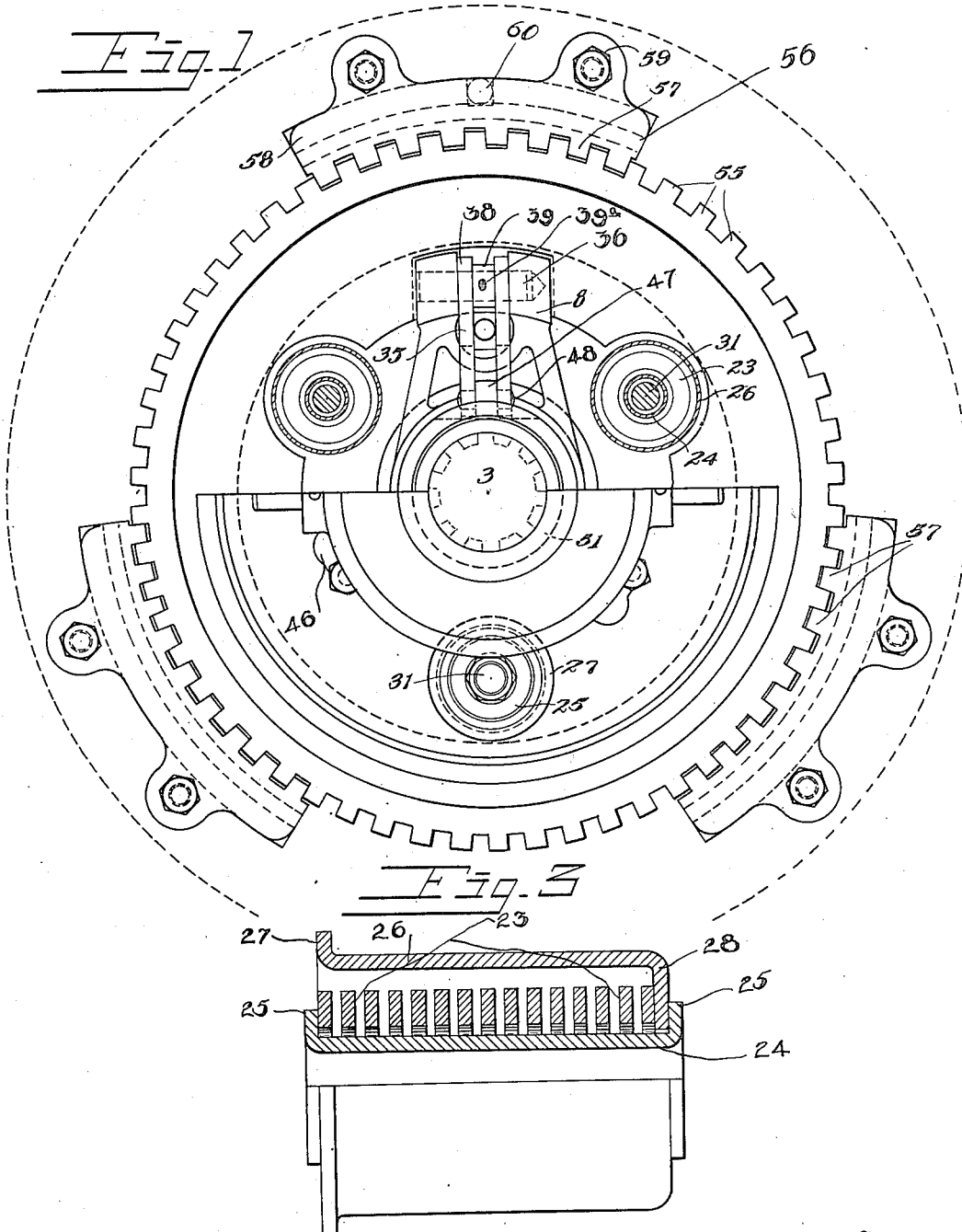

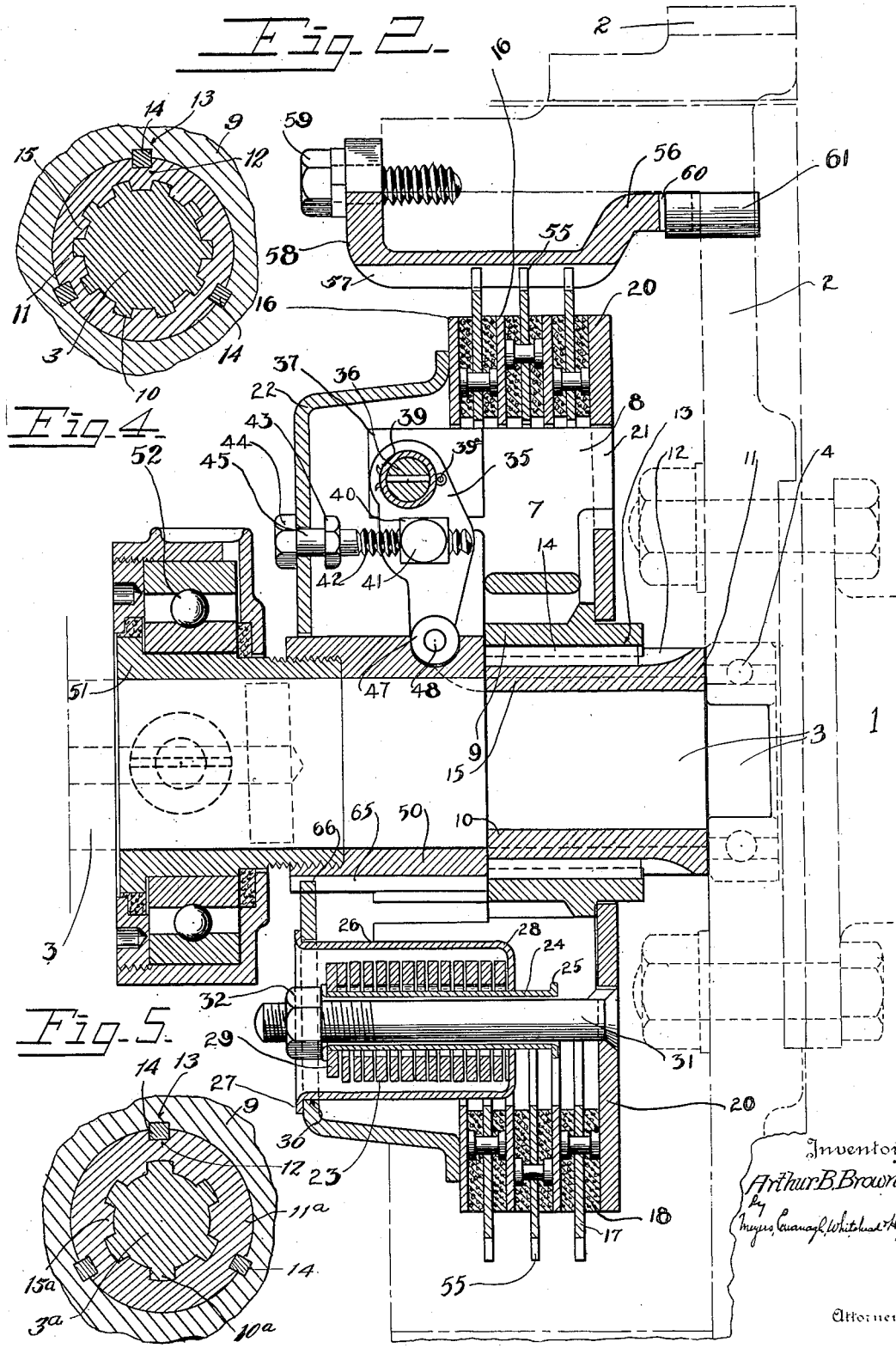

1,472,114

UNITED STATES PATENT OFFICE.

ARTHUR B. BROWNE, OF HARTFORD, CONNECTICUT; ANNA H. BROWNE EXECUTRIX OF SAID ARTHUR B. BROWNE, DECEASED.

FRICTION CLUTCH.

Application filed September 23, 1921. Serial No. 502,676.

*To all whom it may concern:*

Be it known that I, ARTHUR B. BROWNE, a citizen of the United States, residing at Hartford, in the county of Hartford and State of Connecticut, have invented new and useful Improvements in Friction Clutches, of which the following is a specification.

My invention relates to friction clutches, especially adapted for use in motor vehicles, although not limited to such use.

Certain features of the invention pertain to clutches of the multiple disk type and other features are adaptable to that and other types of clutches.

Among the objects of the invention are to improve the general structure of clutches of the multiple disk type; to provide very inexpensive and convenient means for connecting the drive plates of the clutch to the initial clutch driving member, usually the fly wheel of an engine, and to compensate for wear at the connection points; to provide very simple and effective means for adjusting the releasing mechanism when adjustment is desired to compensate for wear of the friction surface, or for other reasons; to provide a new and improved arrangement of the clutch springs to permit easy adjustment and especially to facilitate the replacement of these springs; and to provide readily replaceable bushings which form the driving connection between the main driven member or plate of the clutch and the clutch shaft, to enable a clutch of otherwise standard design to be readily adapted to different styles of clutch shafts.

The accompanying drawing shows the invention physically embodied in a multiple disk clutch. After considering this embodiment as explained in detail, persons skilled in the art will understand that many variations may be made without departing from the invention, and I contemplate the employment of any structures that are properly within the scope of the appended claims.

In the drawings:

Fig. 1 is a rear view, the upper half in section just back of the releasing levers and the lower half in elevation.

Fig. 2 is a vertical longitudinal section.

Fig. 3 is a detail end section of one of the spring units apart from the rest of the structure.

Figures 4 and 5 are cross sections through the clutch shaft, the hub of the main driven member or spider and the interposed adapter sleeve, showing arrangements of the adapter sleeve for two different shaft spline arrangements.

The clutch in the present embodiment is especially adapted for emplacement in a motor vehicle between the engine and the transmission gearing. The drawing shows the flanged rear end 1 of the engine shaft with the fly wheel 2 bolted to the flange. The clutch shaft 3, which in these adaptations is usually the primary driving shaft of the transmission gearing, has its forward end revolubly mounted in a ball bearing 4 properly seated in a recess provided in the rear end of shaft 1 or in the fly wheel. It is very desirable to provide a clutch which can, without any alterations, or with only inconsiderable changes, be mounted in such a location in various motor vehicles in which the details of design vary to a considerable extent, but, of course, the clutch is also adaptable to other locations and uses.

The clutch proper has a main driven member or spider 7 including radial extensions 8 and a hub 9. This hub is centrally bored and according to ordinary practice would be channeled or splined to fit splines 10 on the forward end of the driven shaft 3. But it is customary for different manufacturers to provide the shafts 3 with different numbers of splines, four, six and ten in some cases, and to enable a clutch of otherwise fixed or standardized construction to be readily adaptable to such different shafts, a sleeve bushing 11 is provided which has one or more outer channels or splines 12 and the bore of the hub 9 is suitably formed to cooperate with the outer formation of the bushing. For instance, it may be provided with channels or key-ways 13 and keys 14 may be inserted to connect the hub and bushing irrevolubly together. The bore of the bushing is formed with a suitable plurality of splines 15 to suit the number on the particular clutch shaft 3. A suitable number of different designs of bushings are provided having different numbers of internal splines, to fit the different clutch shafts usually manufactured. Figures 4 and 5 show two specific forms of bushings or adapter sleeves 11 and 11ª having different internal spline arrangements, specifically, having different numbers of splines 15 and 15ª to properly cooperate with shafts 3 and 3ª having different numbers of splines 10 and 10ª. In supplying a number of clutches to be used with a clutch shaft of any given design, it is only necessary to insert bushings 15 having the proper number of internal splines.

The radial arms or projections 8 are formed to enter recesses in the driven clutch disks 16, with sufficient clearance to permit the necessary slight movement of the plates in the direction of the shaft axis. The driving plates or disks 17 are located between the driven disks and the disks of one set, in this case the driving disks are provided with friction facings 18, as usual. The spider 7 also carries an inner or main driven plate 20 to co-operate with the friction material of the innermost driving disk, and this plate is recessed for driving engagement with lugs 21 formed on the radial members 8. The outermost or rearward driven disk 16 is engaged by the rim face of a dished pressure plate 22.

The clutch springs 23 of any suitable number, usually three, are desirably of the flat section helical type, and are desirably arranged to exert their pressure directly, that is without any leverage or power multiplication, to urge plates 20 and 22 toward each other and thus to apply pressure to the friction surfaces. It is a matter of considerable difficulty, usually, to put such springs into position, either in the original manufacture and assembly of the clutch, or specially in necessary replacements made by users who may have inadequate tools or skill. Provision is, therefore, made for associating each spring with additional parts to form an operative unit, which may be put in position very easily by unskilled persons and with the simplest tools. Each spring unit comprises an inner sleeve 24 having shallow end flanges 25 and an outer sleeve 26 having a flange 27 at its outer end and having a bottom or inner end 28, this being provided with a central hole accommodating the sleeve 24 with moderate clearance. The spring 23 is located about the sleeve 24 and is confined between the bottom of the outer sleeve and the left hand flange 25 of the inner sleeve, and when free from the clutch the spring, of course, expands until the right hand flange 25 is against the bottom 28. The spring is usually under moderate compression and the parts are designed so that when the unit is put in place in the clutch the spring bolt can be inserted and its nut started without any further compression of the spring so that the difficulty usually encountered in compressing the spring to connect the spring bolt and nut is entirely avoided. Fig. 3 shows one of the clutch units consisting of the outer or cup sleeve 26, inner sleeve 24 and the spring 23 after initial assembly of this unit, and as it is ready to be put into the clutch structure. The spring is considerably more extended than it will be when in operative position, but is somewhat compressed between the left flange 25 and the bottom 28 of the cup, the parts and the amount of compression of the spring being so arranged that when it is put into position in the clutch structure the bolt may be inserted and the nut placed on the end threads of the bolt without having to compress the spring and then the necessary compression for operative purposes is obtained by screwing up the nut as later described. As shown in Figure 3 one of the flanges 25 may be formed on sleeve 24 after its insertion. The spring may also be confined in different ways, for example, as shown in Fig. 2, by means of a split or slotted washer 29 straddling sleeve 24 and located between the left hand flange 25 and the adjacent end of the spring. When the unit is put into the clutch the cup sleeve 26 is passed through a hole 30 of suitable diameter in the flat outer face of the pressure plate and flange 27 bears against the plate. The spring bolt 31 is inserted through a hole in plate 20 and passed through sleeve 24. The spring at this time is, of course, moderately compressed, but extended as far as permitted by the outward movement of sleeve 24, and in this position only one or two of the end threads of the bolt are exposed beyond the adjacent end of the inner sleeve. The nut 32 is engaged with these threads and screwed down on the bolt, engaging against the left hand end of sleeve 24 and compressing the spring until the right end flange 25 is away from the bottom 28 of sleeve 26. The spring pressure is thus applied through the outer sleeve 26 and the bolt to the clutch plates 22 and 20, respectively. When it is desired to remove a spring, its nut is simply unscrewed and before the nut is entirely free from the bolt the expansion of the spring is checked by flange 25 engaging against the bottom 28 of sleeve 26, and the entire unit may then be removed and another one inserted without any annoyance from complete expansion of the spring, as sufficiently indicated above. Since the springs act directly without leverage multiplication, they elongate only slightly as the friction surfaces wear and adjustment is either unnecessary during the entire life of the clutch or it need be made at only infrequent intervals and with little trouble on account of the arrangement of nuts 32 at the rearward accessible face of pressure plate 22 and with plenty of clearance around the nuts for application of an ordinary wrench.

It is desirable to provide releasing mechanism, incorporated in the clutch proper, which includes power multiplying means, so that with clutch springs of adequate strength and with a clutch pedal as ordinarily provided in motor vehicles, with the leverage ratio limitations ordinarily applying to such pedals, the clutch may be released without undue exertion of the driver. My invention provides for this purpose releasing levers 35 arranged to give sufficient power multiplication for the purposes described and also arranged so that they may be adjusted in a very advantageous and simple way. There is a suitable plurality of these levers, usually three, and each lever is pivotally mounted on a pin 36 passing through lugs 37 on the rearward face of one of the radial arms 8, these lugs being spaced apart sufficiently to accommodate the lever. The lever may vary considerably in form, but conveniently it consists of two plates 38 of similar outline. These are spaced apart on pin 36 by a washer 39, which is secured by a cotter pin 39$^a$. Below the pin a screw block 40 is located between the lever plates, and this block has trunnions 41 fitting in bearing holes in the plates. The block is centrally bored and screw threaded to receive a screw 42, and this screw desirably has two heads 43 and 44 spaced apart considerably more than the thickness of the pressure plate 22; and the shank 45 of the screw between the heads passes through an aperture in the pressure plate. To provide for easily passing the screws through the plate and locating their shanks in the proper position, the plate is desirably provided with a button hole aperture 46 for each of the screws, the large portion of this aperture being of sufficient size to pass the heads 43 and 44, or at least the inner one of them. When the screws are all inserted the pressure plate is turned slightly in relation to the spider 7 and the shanks 45 of the screws then come simultaneously into the small parts of the button hole apertures and relative movement of the screws and plate is then limited to the clearance between the screw heads. The threaded portions of the screws 42 are designed to have a very tight fit in the threaded bores of the screw blocks, so that the screws will not turn and lose adjustment from the vibration of the engine or vehicle, or other suitable locking means may be provided, if desirable. The inner ends of the two plates 38 of each lever are spaced apart by a roller 47 located on a pin 48 passing through holes in the lever plates. The rollers 47 rest in sockets provided in a short sleeve 50, and the rear end of this sleeve is screw-threaded to receive another sleeve 51, and this sleeve carries the usual clutch collar and bearing 52 for release of the clutch by the usual pedal lever. With the parts arranged as shown in Fig. 2, rearward movement of the clutch collar first moves the inward ends of the levers 35 to the left idly until the inner heads 43 of screws 42 engage the pressure plate. Thereupon movement of the clutch collar and sleeves acts through the levers with suitable multiplication of power to separate the driven plates 22 and 20 and relieve pressure on the friction surfaces and so the clutch is released. After much use wear of the friction surfaces will permit plates 20 and 22 to approach each other and eventually plate 22 would be almost in contact with the inner screw heads 43. When by reason of such wear or for any other reason it is necessary to adjust the releasing action of the clutch, it is only necessary to apply a wrench to the outer screw heads 44 and turn the screws in until the outer heads engage or nearly engage the outer surfaces of the pressure plate. Proper clearance will then be restored between the inner heads 43 and the plate and the releasing action will be restored to normal condition. The screw heads 44 are readily accessible and the described adjustment may be easily and quickly made by unskilled persons.

There are two principal methods of connecting the driving plates of multiple disk clutches to the fly wheel—one by pins secured in the fly wheel and which engage sockets in the plates and the other by forming each plate with a toothed periphery very similar to the form of a thin gear wheel and providing a complemental internally toothed ring, cut in or bolted to the fly wheel to receive the teeth of the driving plates.

The toothed drive is considered preferable for many reasons, but as ordinarily provided it is unduly expensive, mainly because of the cost of producing the internal toothed ring for attachment to the fly wheel, or the cost of milling these teeth in the fly wheel itself. I provide, in connection with other features of my invention, for what is substantially a toothed form of connection for the driving plates, and which realizes all the structural and operative advantages of the toothed connection, and in addition immensely reduces the cost of the usual toothed connection, and at the same time provides for cheaply and easily compensating for wear which occurs between the teeth of the driving element on the fly wheel and those of the driving plates after long service. The driving plates 17 are each provided with a continuous series of peripheral teeth 55, substantially as usual in the toothed method of attachment. Instead, however, of providing on the fly wheel a continuous internally toothed ring, I provide a plurality of segment pieces 56 suitably shaped to conform to the usual or particular shape of fly wheel in view. Each of these segments has an inward arc-shaped surface provided with a short series of teeth 57 complemental to and slidably engaging the teeth of the driving disks 17. The form and details of these toothed segments may vary greatly. In the particular form here shown they have an outer flange 58 fitting against the face of the fly wheel and are secured by screws 59 passing through holes in this flange and engaging in the fly wheel, and they also have an inward portion provided with a socket 60 in which rests a pin 61 fixed in the fly wheel. There may be any convenient plurality of the segment pieces 56. In the present case there are three, equally spaced about the fly wheel and the toothed length of each segment may vary, but is desirably made, for example, where there are three segments, somewhat shorter than the distance between the segments. The toothed segments or sectors secure the driving plates irrevolubly in respect to the fly wheel and permit necessary longitudinal movement in the usual way, but they are far cheaper than the continuous fly wheel ring or toothed surface, usually provided, and in addition they may be individually removed and replaced, cheaply, if any defect develops. A still more important consideration, however, is that when the engaging teeth have become unduly worn so that there is any objectionable play in the direction of rotation, the entire clutch structure or the clutch disks may be moved out to free the teeth of the driving clutch disks from the teeth of the segments, and then the driving disks may be rotated to bring previously unused teeth opposite the toothed sectors, and the plates then moved again into operative position, whereupon fresh and unworn disk teeth are in engagement with the segments and the wear is thus compensated for without any replacement of parts and in a very easy and simple way. If after long service the teeth of the segments themselves are unduly worn they may be cheaply and easily replaced and, of course, if necessary, specially formed teeth may be provided on replacement segments to co-operate with worn disk-teeth, if such a provision is necessary or desirable.

The main driven plate 20 is separate from the main body or spider, and is readily removable and replaceable at small cost. When in operative position, of course, it is always held up snug against suitable seats or shoulders on the spider in the position shown in the drawing.

It is desirable to prevent rotative displacement of the pressure plate 22 after it is positioned in regard to the releasing screws, as previously described. This is provided for in the present case by forming one or more grooves 65 in sleeve 50 and providing the apertured center of the pressure plate with one or more corresponding projections 66 slidably engaging the grooves. The rotative movement of the pressure plate to locate it in relation to the releasing screws may be accomplished before the springs are inserted or before they are tensioned by turning down the nuts 32.

An important feature of the general structure and arrangement described is that almost the entire clutch structure constitutes a unit originally independent of and separate from the fly wheel. The clutch parts are located upon the shaft 3 and the only parts placed on the fly wheel which perform a true clutch function are the segment pieces 56. The releasing levers are self-contained within the clutch structure, being housed between the main driven plate 20 and the pressure plate, and these levers are moreover in the present preferred construction pivoted upon the main spider or driven member of the clutch. The driven disks also are mounted on this spider between the main driven plate and the pressure plate. The structure is, therefore, independent of any housing or plates carried by the fly wheel and which in certain other clutches render the parts inaccessible or complicate the construction in various ways.

While the interfitting projections or ribs 55 and 57 of the clutch disks and segments 56 respectively, are most conveniently referred to as teeth, it should be understood that these are not necessarily of gear tooth form, and in fact, as clearly shown in the drawing, they are usually made of simple rectangular cross sectional form. The description of these members as teeth in certain of the claims is, therefore, not intended as a limitation in respect to the form of these ribs.

What I claim is:—

1. A friction clutch comprising a main driven member arranged for mounting on a shaft and including a main driven plate, a pressure plate, at least one driving disk between the plates, spring means urging the main plate and pressure plate convergently, a releasing lever mounted in the main driven member and substantially enclosed within the pressure plate, a member connected to the lever and arranged to bear against the pressure plate, and a shifter connected to the inward end of the lever.

2. A friction clutch structure adapted for mounting on a transmission or like shaft, comprising a main driven member adapted for irrevoluble connecton with the shaft, a main driven plate on said member, a pressure plate, friction disks between said plates, springs located substantially between the plates and connected to exert direct pressure to move the plates convergently, releasing levers mounted in the main driven member, members extending from the levers and arranged to bear against the pressure plate, and a clutch shifter located about the shaft and engaging the inward ends of the levers.

3. A friction clutch comprising a main driven member, a friction plate thereon, a pressure plate, a friction driving member between the plates, spring means urging the plates together, a releasing lever having a pivot mounting in said main driven member, a shifter engaging one end of the lever for the releasing movement, a releasing member connected to the lever and extending to the pressure plate, and means admitting of adjustment of said releasing member to restore the releasing action to normal condition after wear of the friction surfaces.

4. A friction clutch comprising a main driven member, a friction plate thereon, a pressure plate, a friction driving member between the plates, spring means urging the plates together, a releasing lever having a pivot mounting in said main driven member, a shifter engaging one end of the lever for the releasing movement, and a releasing member connected adjustably to the lever and extending through the pressure plate, and provided with an inner part to engage the plate in the releasing action and an outer part accessible for adjustment of the releasing member.

5. A friction clutch comprising a spider adapted for non-rotative connection to a rotary shaft, a main driven plate carried by the spider, a pressure plate, spring means urging the main plate and pressure plate together, friction disks between the plates, certain of them having non-rotative engagement with the spider and certain of them being free to revolve about the spider, a releasing lever between the plates and having a pivotal mounting on the spider, a releasing element connected to the lever and having a member arranged to engage the pressure plate, and a releasing sleeve on the shaft having connection with the free end of the lever.

6. A friction clutch comprising a spider arranged for non-rotative connection on a rotary shaft, a separable main driven plate carried by the spider and having non-rotative connection therewith, a pressure plate, spring means urging the main plate and pressure plate together, friction disks between the plates, certain of them having non-rotative engagement with the spider and certain of them being free to revolve about the spider releasing levers between the plates and each having pivotal mounting on the spider, a releasing element connected to each lever and having a member arranged to engage the pressure plate with substantial lost motion to move the pressure plate away from the main plate and release the clutch, and a releasing sleeve on the shaft having connection with the free ends of the levers.

7. A friction clutch comprising a spider arranged for non-rotative connection on a rotary shaft, a separable main driven plate carried by the spider, and having non-rotative connection therewith, a pressure plate, spring means urging the main plate and pressure plate together, friction disks between the plates, certain of them having non-rotative engagement with the spider, and certain of them being free to revolve about the spider, releasing levers between the plates and each having a pivotal mounting on the spider, a releasing element engaging each lever and having a member arranged to engage the pressure plate with lost motion to move the pressure plate away from the main plate to release the clutch, said releasing element being provided with means admitting of adjustment of its effective length and with a head external to the plate, and a releasing sleeve on the shaft having connection with the free ends of the levers.

8. A friction clutch comprising a shaft, two plates arranged to rotate with the shaft, releasing means, one or more friction disks between the plates, and spring means urging the plates together, comprising one or more spring units, substantially enclosed within the limits defined by the plates, each of which includes a spring, a cup-like member containing the spring and engaging one end thereof, the other end of the cup-member detachably engaging one of said plates, and a bolt engaging the other of said plates and passing through the spring and operatively engaging the other end thereof.

9. A friction clutch comprising a shaft, two plates arranged to rotate with the shaft, releasing means, one or more friction disks between the plates, and spring means urging the plates together, comprising one or more spring units, substantially enclosed within the limits defined by the plates, each of which includes a spring, a cup-like member containing the spring and engaging one end thereof, the other end of the cup-member engaging one of said plates, a bolt engaging the other of said plates and passing through the spring and operatively engaging the other end thereof, and means co-operating with the cup-member and spring for retaining the latter in partial compression when released from the bolt.

10. A friction clutch comprising two driven plates arranged for mounting on a driven shaft, releasing levers between the plates, one or more friction disks between the plates and spring means urging the plates together, comprising one or more springs enclosed substantially between the plates, a spring pocket for each spring in which the spring is located in engagement with an inward end thereof, the outward end of the pocket detachably engaging one of said plates, and bolts engaging the other of said plates, and each passing through one of the springs and operatively engaging the outward end thereof.

11. A friction clutch comprising two driven plates arranged for mounting on a driven shaft, releasing levers between the plates, one or more friction disks between the plates and spring means urging the plates together, comprising one or more springs, enclosed substantially between the plates, a spring pocket for each spring in which the spring is located in engagement with an inward end thereof, the outward end of the pocket engaging one of said plates, bolts engaging the other of said plates, and each passing through one of the springs and operatively engaging the outward end thereof, and a spring retaining sleeve between each spring and its bolt and arranged to act between the spring and its pocket when the spring is substantially released from compression by the bolt, to prevent full expansion of the spring.

12. As an operative composite unit of a friction clutch, a driven clutch structure comprising a body or spider, including a main driven plate, a pressure plate, releasing means and one or more spring units, each comprising a cup engaging the pressure plate, a spring therein, a sleeve within the spring and engaging the outward end thereof and having the other end adapted to engage the cup bottom when the spring is considerably extended and still under some compression, and a bolt engaging the main driven plate and passing through the sleeve and engaging the outward end of the sleeve.

13. A driven clutch structure adapted for mounting on a shaft, such as a transmission shaft adjacent to the driving member such as an engine fly wheel, said driven structure comprising a body or spider, a separate main driven plate thereon, an axially movable pressure plate rotating in unison with the spider, releasing means, and one or more spring units, each comprising a cup-sleeve, a spring therein, a sleeve within the spring and engaging the outward end thereof and having the other end adapted to engage the cup bottom when the spring is considerably extended and still under some compression, and a bolt engaging the main driven plate and passing through the sleeve and engaging the sleeve at the outward end thereof, said spring and associated parts retaining the main driven plate in position and urging it and the pressure plate convergently.

14. A friction clutch comprising a main driven body, a detachable main driven plate located substantially at the inward end of the body and locked against rotative motion thereon, an axially movable pressure plate, driving and driven disks located between the main plate and pressure plate, the driven disks having non-rotative engagement with peripheral portions of said body, and the driving plates being free to rotate between the adjacent driven friction surfaces, springs located substantially within the space between said plates, sleeve pockets enclosing the springs and engaging the pressure plate, bolts engaging the main driven plate and passing through the springs and engaging their outward ends, releasing levers fulcrumed in rearward portions of said body, a block pivotally mounted in each lever inwardly from the fulcrum, a releasing screw engaging in each block and extending outward and having a head to engage the pressure plate for releasing the clutch the screw also having a shank extending beyond said head through a hole in the plate and provided with an outer head for adjusting the screw, and a releasing sleeve passing through the rear central portion of the pressure plate and engaging the inward ends of the levers.

15. A friction clutch comprising a main driven body having radial arms, a main driven plate located substantially at the inward end of the spider and detachably coupled with the arms and locked against rotative motion in relation to the spider, an axially movable dished pressure plate, driving and driven disks located between the main plate and pressure plate, the driven disks having non-rotative engagement with end portions of said arms, and the driving plates being free to rotate in relation to the arms and between the adjacent driven friction surfaces, springs located substantially within the space between said plates, sleeve pockets enclosing the springs and engaging the pressure plate, bolts engaging the main driven plate and passing through the springs and engaging their outward ends, releasing levers fulcrumed in outward extensions of said arms, a block pivotally mounted in each lever inwardly from the fulcrum, a releasing screw engaging in each block and extending outward and having a head to engage the pressure plate for releasing the clutch, the screw also having a shank extending beyond said head through a button-hole aperture in the plate and provided with an outer head for adjusting the screw, and a shifter sleeve passing through the rear central portion of the pressure plate and engaging the inward ends of the levers.

16. A driven structure for a friction clutch, comprising a driven spider, a main driven plate and friction disks located on the spider, a pressure plate, releasing means, spring means for urging the main plate and pressure plate together, and a removable bushing arranged to be irrevolubly secured in a central aperture in the spider and provided with internal splines arranged for cooperation with a certain spline formation of a clutch shaft on which the clutch mechanism is to be mounted.

17. In a friction clutch, a driven clutch structure adapted to co-operate with an engine fly wheel and including one or more driving disks each having a continuous toothed periphery, and a plurality of driving segments each having an arc shaped portion adapted to lie within the fly wheel rim and a series of driving teeth to co-operate with corresponding segments of the driving disks, and each also having a flange adapted to lie against the fly wheel rim face and to be bolted thereto, these driving segments being devised so that a number of them may be secured in spaced relation about the fly wheel to form substantially an interrupted toothed driving ring for the driving disks.

18. A spring assembly for friction clutches comprising a spring, a cage substantially enclosing the spring and having its bottom engaged by one end of the spring, an inner member passing through the spring and having at one end means to engage the cage bottom and at the other end means to engage the free end of the spring, whereby the spring is retained in compression and is free to be additionally compressed when placed in a clutch structure by movement of the inner member in relation to the cage.

19. A spring assembly for friction clutches comprising a helical spring, a cup-like sleeve substantially enclosing the spring and having its bottom engaged by one end of the spring, an inner sleeve passing through the spring and having at one end a flange to engage the cup-bottom and at the other end means to engage the free end of the spring, whereby the spring is retained in compression and is free to be additionally compressed when placed in a clutch structure by movement of the inner sleeve in relation to the cup.

20. In a rotary friction clutch, the combination with two members arranged for concurrent rotation about a common axis and also arranged to have a relative convergent motion to effect engagement of the clutch, of spring mechanism urging said members convergently and comprising a helical spring, a spring housing in which the spring is located with one end bearing against an end portion of the housing, the other end of the housing being arranged for connection with one of said members, a rod passing through the spring and engaging the other of said members, means associated with the rod for compressing the spring and applying its expansive force to draw the members together, and means associated with the spring and spring housing to retain the spring in partial compression after the spring compressing means has been relaxed sufficiently to free said members from spring tension.

21. In a rotary friction clutch, the combination with two members arranged for rotation about a common axis and also arranged to have a relative convergent motion to effect engagement of the clutch, of spring mechanism urging said members convergently and comprising a helical spring, a spring housing in which the spring is located with one end bearing against an end portion of the housing, the other end of the housing being arranged for detachable engagement with one of said members, a rod passing through the spring and engaging the other of said members, means associated with the rod for compressing the spring and applying its expansive force to draw the members together, and means associated with the spring and spring housing to retain the spring in partial compression when the spring and its housing are separate from the clutch structure.

22. In a friction clutch structure, the combination with two rotary members arranged for relative convergent movement to effect the clutch engagement, and clutch releasing means, of a removable spring unit comprising a spring cage, adapted for engagement with one of said members, a helical spring therein having one end engaging against an end of the cage, a sleeve within the spring and engaging the free end thereof, and having one end movably engaging said end of the cage, the sleeve and cage serving to hold the spring in partial compression when the spring unit is separate from the clutch, a spring bolt engaging the other of said members and passing through the sleeve, and a nut on the bolt to further compress the spring and apply its tension to move said members convergently.

23. In a friction clutch structure, the combination with two rotary members arranged for relative convergent movement to effect the clutch engagement, and clutch releasing means, of a removable spring unit comprising a spring cage, flanged at its open end for engagement with one of said members, a helical spring therein having one end engaging against an end of the cage, a sleeve within the spring and having one end engaging the free end thereof, and having at its other end a flange movably engaging said end of the cage, the sleeve and cage serving to hold the spring in partial compression when the spring unit is separate from the clutch, a spring bolt engaging the other of said members and passing through the sleeve and a nut on the bolt to further compress the spring and apply its tension to move said members convergently.

24. In a friction clutch structure, the combination with two rotary members arranged for convergent movement which effects clutch engagement, and spring means for urging the members together, of a releasing lever fulcrumed at a fixed point in relation to one of the members, a rod adjustably connected to the lever and extending toward the other of said members and having a part to engage with said member to move the two members apart and release the clutch, and a shifter connected with the free end of the lever.

25. In a friction clutch structure, the combination with two rotary members arranged for convergent movement which effects clutch engagement, and spring means for urging the members together, of a releasing lever fulcrumed at a fixed point in relation to one of the members, a rod adjustably and pivotally connected to the lever and extending toward the other of said members and having a part to engage with said member to move the two members apart and release the clutch and also having an externally located member for adjustment movement of the rod, and a shifter connected with the free end of the lever.

26. In a friction clutch the combination with two driven members arranged for rotatable mounting on a common axis and also arranged for relative convergent movement to effect clutch engagement, and spring means to urge the members together, of a releasing lever pivotally mounted at a fixed point in relation to one of the members, a screw block pivotally mounted on the lever, a releasing screw engaging the screw block and provided with an inner and an outer head and having a shank between the heads accommodated in an aperture in one of the members, the heads being separated a distance greater than the thickness of the adjacent part of the member, the inner head being adapted to engage said member to release the clutch, and the outer head being adapted to rotate the screw to adjust the releasing action, and a shifter connected to the power end of the lever.

27. In a friction clutch the combination with two driven members arranged for rotatable mounting on a common axis and also arranged for relative convergent movement to effect clutch engagement, and spring means to urge the members together, of a releasing lever pivotally mounted at a fixed point in relation to one of the members, a screw block pivotally mounted on the lever, a releasing screw engaging in the screw block and provided with an inner and an outer head and having a shank between the heads, one of said driven members having a button-hole aperture in which said shank is located, the heads being separated a distance greater than the thickness of the adjacent part of the member, the inner head being adapted to engage said member to release the clutch and the outer head being adapted to rotate the screw to adjust the releasing action, and a shifter connected to the power end of the lever.

28. A releasing lever for a friction clutch, comprising two plates spaced apart on a fulcrum pin mounted in a clutch member, a screw block between the plates and pivotally engaging them, a releasing screw threaded into the block and having a head adapted to engage another clutch member to release the clutch, and a roller between the lower ends of the two plates mounted on a pin passing through the plates and adapted to engage a clutch shifter.

29. A releasing lever for a friction clutch, comprising two plates spaced apart on a fulcrum pin mounted in a clutch member, a screw block between the plates and pivotally engaging them, a releasing screw threaded into the block and having two separated heads with an intermediate shank adapted to pass through an aperture in another clutch member and one of said heads being adapted to engage said other clutch member to release the clutch, and a roller between the lower ends of the two plates mounted on a pin passing through the plates and adapted to engage a clutch shifter.

30. A driven structure for a friction clutch, comprising a spider having a hub, radial arms and lugs on the forward and rearward faces of the arms, a detachable main driven plate located substantially at the forward end of the spider and having apertures engaging said forward lugs to prevent rotative movement of the plate in relation to the spider, a releasing lever located in a slot in each of said rearward lugs and mounted on a fulcrum pin seated in the lug, an axially movable pressure plate, connections from the releasing levers to the pressure plate, a shifter connected to the inward ends of the levers, one or more friction disks located about the outward ends of said arms and between the main driven and pressure plates, and springs connected to move the main driven and pressure plates convergently to effect clutch engagement and retain the main pressure plate in position.

31. A driven structure for a friction clutch comprising a spider having a hub, radial arms and lugs on the forward and rearward faces of the arm, a detachable main driven plate located substantially at the forward end of the spider and having apertures engaging said forward lugs to prevent rotative movement of the plate in relation to the spider, a releasing lever located in a slot in each of said rearward lugs and mounted on a fulcrum pin seated in the lug, an axially movable pressure plate, a screw having an adjustable and pivotal connection with each lever and extending through an aperture in the pressure plate and provided with an inner head for the releasing action and an outer head to effect and limit adjustment, a shifter connected to the inward ends of the levers, one or more friction disks located about the outward ends of said arms and between the main driven and pressure plates, and springs connected to move the main driven and pressure plates convergently to effect clutch engagement and retain the main pressure plate in position.

Signed this 6th day of Sept., 1921, in the presence of witnesses.

ARTHUR B. BROWNE.

Witnesses:
EGBERT E. STACKPOLE,
MAE F. COPELAND.